United States Patent [19]
König et al.

[11] Patent Number: 5,738,912
[45] Date of Patent: Apr. 14, 1998

[54] DISPERSION OF POST-CURABLE COATING COMPOUNDS

[75] Inventors: Eberhard König, Leverkusen; Detlef-Ingo Schütze; Josef Pedain, both of Köln, all of Germany

[73] Assignee: Bayer Aktiengesellschaft, Leverkusen, Germany

[21] Appl. No.: 760,093

[22] Filed: Dec. 11, 1996

[30] Foreign Application Priority Data

Dec. 21, 1995 [DE] Germany ............... 195 48 030.9

[51] Int. Cl.⁶ .................................................. B05D 7/12
[52] U.S. Cl. .................. 427/389; 427/389.9; 427/394
[58] Field of Search .................. 427/389, 389.9, 427/392, 394, 396

[56] References Cited

U.S. PATENT DOCUMENTS

| | | | |
|---|---|---|---|
| 3,687,715 | 8/1972 | Kigane et al. | 117/76 R |
| 4,299,868 | 11/1981 | Berndt et al. | 427/389.9 |
| 4,507,413 | 3/1985 | Thoma et al. | 524/42 |
| 4,728,542 | 3/1988 | Nachtkamp et al. | 427/389 |
| 4,743,470 | 5/1988 | Nachtkamp et al. | 427/246 |
| 5,563,208 | 10/1996 | König et al. | 427/372.2 |

FOREIGN PATENT DOCUMENTS

| | | |
|---|---|---|
| 2109178 | 4/1994 | Canada. |
| 93/24550 | 12/1993 | WIPO. |

*Primary Examiner*—Erma Cameron
*Attorney, Agent, or Firm*—Joseph C. Gil; Richard E. L. Henderson

[57] ABSTRACT

The invention relates to a method for coating textiles and/or leather with an aqueous dispersion comprising (A) a mixture of (i) a urethane-containing blocked NCO prepolymer having a number average molecular weight of 2000 to 10,000, a content of blocked isocyanate groups (calculated as NCO) of 0.5 to 5 wt. %, an ethoxy group content of 2 to 50 wt. %, an ionic group content of 5 to 30 meq per 100 g of the prepolymer, and (ii) a polyamine having (cyclo)aliphatically bonded primary and/or secondary amino groups, wherein the equivalent ratio of blocked NCO groups of component (i) to amino groups of component (ii) is 1:0.9 to 1:1.2, and (B) an aqueous phase.

5 Claims, No Drawings

DISPERSION OF POST-CURABLE COATING COMPOUNDS

BACKGROUND OF THE INVENTION

The invention relates to the use of aqueous dispersions based on (i) blocked isocyanate prepolymers containing ether groups and ionic groups and (ii) polyamine for the coating of textiles and leather.

There are, in principle, two alternatives for polyurethane-based textile and leather coatings. Two-component systems consisting of NCO prepolymers and crosslinkers have been used for some time and have provided outstanding values for adhesion but the normal commercial two-component polyurethane textile and leather coating compositions exist as solutions in organic solvents. Because manufacturers increasingly require aqueous coating compositions, aqueous textile and leather coating compositions have naturally also been designed. Cf., for example, German Offenlegungsschrift 4,236,569. Such single-component systems, however, simply dry out after application and cannot form a chemical bond with the substrate.

Therefore, a requirement exists for textile and leather coating compositions that combine in themselves the advantages of both systems, that is, that can dispense largely or completely with organic solvents, are storable at room temperature, and yield coatings with high adhesion (in particular high wet adhesion) and excellent resistance to water.

It has now been found that coating compositions having the composition described below possess a fortunate combination of desirable properties and are, therefore, exceptionally suitable for use as textile and leather coating compositions.

SUMMARY OF THE INVENTION

The invention, therefore, relates to a method comprising coating textiles and/or leather with an aqueous dispersion comprising (A) a mixture comprising (i) a urethane-containing blocked NCO prepolymer having a number average molecular weight of 2000 to 10,000 (preferably 3500 to 7000), a content of blocked isocyanate groups (calculated as NCO) of 0.5 to 5 wt. % (preferably 1.0 to 2.0 wt. %) relative to prepolymer (A)(i), a content of ethoxy groups (i.e., —CH$_2$CH$_2$O— groups) of 2 to 50 wt. % (preferably 5 to 25 wt. %) relative to prepolymer (A)(i), a content of ionic groups of 5 to 30 meq (i.e., milliequivalents) (preferably 10 to 20 meq) per 100 g of prepolymer (A)(i) (solid), and (ii) a polyamine having (cyclo)aliphatically bonded primary and/or secondary amino groups, wherein the equivalent ratio of blocked NCO groups of component (i) to amino groups of component (ii) is 1:0.9 to 1:1.2, and (B) an aqueous phase.

DETAILED DESCRIPTION OF THE INVENTION

The blocked NCO prepolymers (A)(i) can be prepared by the reaction of (1) organic polyisocyanates and (2) NCO-reactive compounds, wherein the composition and quantity of starting compounds (1) and (2) are selected in such a way that the blocked NCO prepolymers (A)(i) that are obtained contain ethoxy groups, ionic groups, and blocked isocyanate groups in the amounts specified. Thus, NCO-reactive compounds (2) include (a) those with ionic or potentially ionic groups, (b) those with ethoxy groups, and (c) removable blocking agents.

Compounds containing the characteristics of (a) to (c) can also overlap one another. For example, polyethylene glycols having sulfonate groups contain both ionic groups and ethoxy groups and thus combine the characteristics of groups (a) and (b). Similarly, alkali bisulfites contain ionic groups and have a blocking effect and thus combine the characteristics of groups (a) and (c). The following description of suitable starting materials must therefore be considered against this background.

In addition to the compounds (a) to (c) the NCO-reactive compounds (2) can also contain further NCO-reactive compounds different from compounds (a), (b), and (c).

The molecular weights given for the starting compounds (1) and (2) are number average molecular weights that can be calculated from terminal group content and functionality.

Suitable organic polyisocyanates (1) include aliphatic, cycloaliphatic, araliphatic, aromatic, or heterocyclic polyisocyanates, such as are described in *Methoden der Organischen Chemie* (Houben-Weyl), Vol. 14/2, Georg Thieme Verlag, Stuttgart 1963, pages 61 to 70, and by W. Siefken in *Liebigs Annalen der Chemie*, 562, pages 75 to 136.

Preferred polyisocyanates (1) are compounds of the formula Q(NCO)$_n$ having an average molecular weight of less than 800, where n signifies a number from 2 to 4 and Q is an aliphatic C$_4$–C$_{12}$ hydrocarbon residue, a cycloaliphatic C$_6$–C$_{15}$ hydrocarbon residue, an araliphatic C$_7$–C$_{15}$ hydrocarbon residue, or a heterocyclic C$_2$–C$_{12}$ residue having 1 to 3 heteroatoms from the series oxygen, sulfur, and nitrogen.

Examples of the preferred diisocyanates are tetramethylene diisocyanate, hexamethylene diisocyanate ("HDI"), 2-methylpentamethylene diisocyanate, 2,2,4-trimethylhexamethylene diisocyanate ("THDI"); dodecamethylenediisocyanate, 1,4-diisocyanatocyclohexane, 3-isocyanatomethyl-3,3,5-trimethylcyclohexyl isocyanate (isophorone diisocyanate, or "IPDI"), 4,4'-diisocyanatodicyclohexylmethane (available as DESMODUR® W), 4,4'-diisocyanato-3,3'-dimethyldicyclohexylmethane, 4,4'-diisocyanatodicyclohexylpropane-(2,2), 1,4-diisocyanatobenzene, 2,4- or 2,6-diisocyanatotoluene or mixtures of these isomers, 4,4'-, 2,4'-, or 2,2'-diisocyanatodiphenylmethane or mixtures of the isomers, ("MDI")4,4'-diisocyanatodiphenylpropane-(2,2), p-xylylene diisocyanate and α,α,α',α'-tetramethyl-m- or -p-xylylene diisocyanate ("TMXDI") as well as mixtures consisting of these compounds, MDI and DESMODUR W are particularly preferred.

It is, of course, also possible to make (additional) use of the higher functional polyisocyanates known in polyurethane chemistry or of known modified polyisocyanates containing, for example, carbodiimide groups, allophonate groups, isocyanurate groups, urethane groups, and/or biuret groups.

Quite general use can be made of cationic and/or anionic hydrophilic difunctional structural components as incorporable compounds (2)(a) for introducing the ionic groups into the polyurethanes (A), including, for example, dihydroxyl compounds, diamines, or diisocyanates containing ionic or potentially ionic groups. The products are called "potentially ionic" prior to neutralization of acid groups or protonation of amino groups.

Ionic groups for prepolymers (A)(i) include alkali and ammonium carboxylate and sulfonate groups, as well as ammonium groups. Suitable incorporated components (2)(a) for introducing such ionic groups into prepolymers (A)(i) consequently include, for example, dihydroxycarboxylic acids, diaminocarboxylic acids, dihydroxysulfonic acids, and diaminoalkylsulfonic acids, as well as their salts, such as dimethylolpropionic acid, hydroxypivalic acid, ethylene diamine β-ethylsulfonic acid, ethylene diamine propyl- or butylsulfonic acid, 1,2- or 1,3-propylene diamine β-ethylsulfonic acid, lysine, 3,5-diaminobenzoic acid, and their alkali and/or ammonium salts, and the adduct of sodium bisulfite to 1,4-butene-2-diol. Particularly preferred compounds (2)(a) are the addition products of diamines, such as ethylene diamine or isophorone diamine, to acrylic acid, as described, for example, in German Offenlegungsschrift 2,034,479.

The preferred incorporable compounds (2)(a) for introducing ionic groups into prepolymers (A)(i) include, in particular, the aliphatic diols containing sulfonate groups, according to German Offenlegungsschrift 2,446,440, having the formula

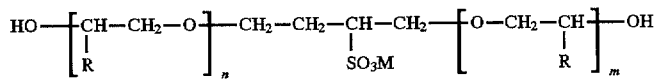

where

R signifies hydrogen or an organic residue with 1 to 8 carbon atoms, m and n signify numbers from 1 to 10, and M signifies ammonium or the cation of an alkali metal.

Examples of (potentially) cationic structural compounds (2)(a) are diols containing tertiary amino groups, such as N-methyl-diethanolamine, or their protonation or alkylation products.

Particularly suitable reactants (2) for the polyisocyanates (1) are mono- and polyhydroxyl compounds which contain 1 to 8 (preferably 1 to 3) hydroxyl groups per molecule and have an (average). molecular weight of up to 10,000 (preferably up to 3,000). Also suitable are both low molecular-weight hydroxyl compounds having molecular weights of 32 to 349 and higher molecular-weight hydroxyl compounds having average molecular weights of at least 350 (preferably of at least 1000), such as are described in detail in the above-mentioned publications.

Higher molecular-weight hydroxyl compounds include hydroxy polyesters, hydroxy polyethers, hydroxy polythioethers, hydroxy polyacetals, hydroxy polycarbonates, and/or hydroxy polyester amides known in polyurethane chemistry, preferably those with average molecular weights of 600 to 4000 and more preferably those with average molecular weights of 800 to 2500. Hydroxy polycarbonates, hydroxy polyethers, and hydroxy polyesters are particularly preferred.

The ethylene oxide groups are preferably present in —(CH$_2$CH$_2$O)$_n$— blocks, wherein the sequence length n is about 3 to about 50 (preferably 10 to 45).

Suitable compounds (2)(b) for the structure of the NCO prepolymers (A)(i), namely for introducing ethylene oxide units, include hydroxy homopolyethylene and hydroxy ethylene oxide mixed polyethers (preferably hydroxy ethylene oxide/propylene oxide mixed ethers), preferably with block distribution, particularly polyether carbonates and polyether esters based on the above-mentioned hydroxy homopolyethylene, hydroxy ethylene oxide mixed polyethers, or their mixtures with other polycarbonate or polyester-forming hydroxyl compounds. If compounds (2) (b) are used to for introduce the ethylene oxide units into the prepolymer (A)(i) of mixed polyethers or polyether carbonates or polyether esters based on such mixed polyethers, the term "ethylene oxide units" preferably includes only the units having the above-mentioned sequence length, whereas ethylene oxide sequences that possess a sequence length above or below these limits are not considered.

The optimum amount of the ethylene oxide units in prepolymer (A)(i) depends somewhat on the sequence length and follows the general rule that short sequence length allows the amount to be somewhat higher and high sequence length allows the amount to be somewhat lower. For example, with a sequence length of 2 the content of the prepolymer (A)(i) in these polyethylene oxide units can be up to 50 wt. %, whereas it is desirable with a sequence length of more than 20 to limit the content of prepolymer (A)(i) in these polyethylene oxide units to 20 wt. %.

The choice of polyethylene oxide monoalcohols on the one hand or polyethylene oxide polyols on the other hand provides a tool for controlling the degree of the achievable water vapor permeability of the coatings. For example, as described in German Offenlegungsschrift 4,236,569, poly- urethane coatings having increased water vapor permeability are obtained if ionic groups and polyethylene oxide units of particular sequence length that originate from incorporated polyetherpolyols (which are incorporated into the main chain of the polyurethane) are incorporated into the polyurethane. This is also applicable to the NCO prepolymers.

To assist the dispersing effect, monofunctional polyethylene oxide alcohols (i.e., ethoxylated monovalent alcohols or ethoxylated phenols) can also be incorporated into prepolymer (A)(i). It is possible, if such monofunctional polyethylene oxide alcohols are incorporated, to dispense with a portion of the ionic groups. Such monofunctional units, however, scarcely contribute to the water vapor permeability of the coatings.

Starting compounds (2)(b) for the prepolymers (A)(i), which supply the polyethylene oxide units, therefore, preferably include ethylene oxidepolyethers containing 2 or 3 hydroxyl groups and ethylene oxide/propylene oxide mixed polyethers having a preponderant portion (i.e., more than 50%) by weight of ethylene oxide units. Pure ethylene oxide polyether alcohols are preferred.

Compounds that are used concurrently with the compounds that supply the specified ethylene oxide units can be selected from the compounds conventionally used in polyurethane chemistry that are able to react with isocyanate groups.

Polyhydroxyl components described below are suitable as polyurethane structural components but do not contain the specified ethylene oxide units.

Suitable polycarbonates that contain hydroxyl groups can be obtained by the reaction of carboxylic acid derivatives, such as diphenyl carbonate or phosgene, with diols. Included among such diols are ethylene glycol, 1,2-and 1,3-propanediol, 1,4-and 1,3-butanediol, 1,6-hexanediol, 1,8-octanediol, neopentyl glycol, 1,4-bis(hydroxymethyl)-cyclohexane, 2-methyl-1,3-propanediol, 2,2,4-trimethylpentane-1,3-diol, dipropylene glycol, polypropylene glycols, dibutylene glycol, polybutylene glycols, bisphenol A, tetrabromobisphenol A. The diol component preferably contains 40 to 100 wt. % hexanediol (preferably 1,6-hexanediol) and/or hexanediol derivatives, preferably those which contain in addition to terminal OH groups ether or ester groups, such as products that are obtained by the conversion of 1 mole of hexanediol with at least 1 mole (preferably 1 to 2 moles) of caprolactone as described in German Auslegeschrift 1,770,245 or by the self-etherification of hexanediol to di- or trihexylene glycol. The production of such derivatives is known, for example, from German Auslegeschrift 1,570,540. The polyether polycarbonate diols described in German Offenlegungsschrift 3,717,060 can also be used very effectively.

The preferred hydroxyl polycarbonates are to be substantially linear but, if desired, can easily be branched by the incorporation of polyfunctional components, particularly low-molecular weight polyols. Suitable polyfunctional components include glycerol, trimethylolpropane, 1,2,6-hexanetriol, 1,2,4-butanetriol, trimethylolpropane, pentaerythritol, quinitol, mannitol and sorbitol, methyl glycoside, and 1,4,3,6-dianhydrohexite.

Suitable polyether polyols include the polyethers known in polyurethane chemistry, such as the addition or mixed addition compounds of tetrahydrofuran, styrene oxide, propylene oxide, the butylene oxides, or epichlorohydrin (particularly of propylene oxide) that are produced with the use of divalent starter molecules, such as water, the abovementioned diols, or amines possessing two NH bonds.

Suitable polyester polyols include reaction products of polyvalent (preferably divalent and optionally in addition trivalent alcohols) with polyvalent (preferably divalent) carboxylic acids. Instead of the free polycarboxylic acids, the corresponding polycarboxylic acid anhydrides or corresponding polycarboxylic acid esters of low alcohols or their mixtures can also be used to produce the polyesters. The polycarboxylic acids can be aliphatic, cycloaliphatic, aromatic, and/or heterocyclic and can optionally be substituted (for example, by halogen atoms) and/or unsaturated.

Suitable polycarboxylic acids include succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylenetetrahydrophthalic acid anhydride, glutaric acid anhydride, maleic acid, maleic acid anhydride, fumaric acid, dimeric, and trimeric fatty acids such as oleic acid, optionally in mixtures with monomeric fatty acids, terephthalic acid dimethyl esters, terephthalic acid bis-glycol esters.

Suitable polyvalent alcohols include ethylene glycol, 1,2- and 1,3-propanediol, 1,4-and 2,3-butanediol, 1,6-hexanediol, 1,8-octanediol, neopentyl glycol, cyclohexanedimethanol (1,4-bis-hydroxymethylcyclohexane), 2-methyl-1,3-propanediol, glycerol, trimethylolpropane, 1,2,8-hexanetriol, 1,2,4-butanetriol, trimethylolethane, pentaerythritol, quinitol, mannitol and sorbitol, methyl glycoside, diethylene glycol, triethylene glycol, tetraethylene glycol, dipropylene glycol, dibutylene glycol, and polybutylene glycols.

Also particularly preferred are mixtures of the abovementioned polyether polyols with polycarbonate polyols and/or polyester polyols having average molecular weights of 1,000 to 3,000 derived from adipic acid and 1,6-hexanediol and neopentyl glycol.

Further structural components suitable for producing prepolymers (A)(i) include in particular chain extenders having molecular weights of 32 to 299 and containing 1 to 4 hydroxyl and/or amino groups.

Suitable low molecular-weight polyhydroxyl compounds ("chain extension agents") include many different kinds of diols, including (a) alkanediols such as ethylene glycol, 1,2- and 1,3-propanediol, 1,4-butanediol, 1,5-pentanediol, 1,3-dimethylpropanediol, and 1,6-hexanediol;

(b) ether diols such as diethylene glycols, triethylene glycol, or hydroquinone dihydroxyethyl ether;

(c) ester diols of the general formulas

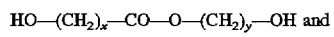

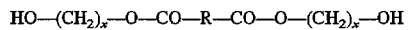

in which

R is an alkylene or arylene residue having 1 to 10 (preferably 2 to 6) carbon atoms, x is 2 to 6, and y is 3 to 5, for example, δ-hydroxybutyl-ε-hydroxycaproic acid ester, ω-hydroxyhexyl-γ-hydroxybutyric acid ester, adipic acid γ-hydroxyethyl ester, and terephthalic acid bis(β-hydroxyethyl) ester.

Polyamines can, however, also be used as chain extenders. Aliphatic or cycloaliphatic diamines are preferred, although optionally tri- or higher-functional polyamines can be additionally used to achieve a certain degree of branching. Examples of suitable aliphatic polyamines are ethylene diamine, 1,2- and 1,3-propylene diamine, 1,4-tetramethylene diamine, 1,6-hexamethylene diamine, the isomeric mixture of 2,2,4- and 2,4,4-trimethylhexamethylene diamine, 2-methylpentamethylene diamine, and bis(β-aminoethyl)amine (diethylene triamine).

Examples of suitable cycloaliphatic polyamines are those having the formulas

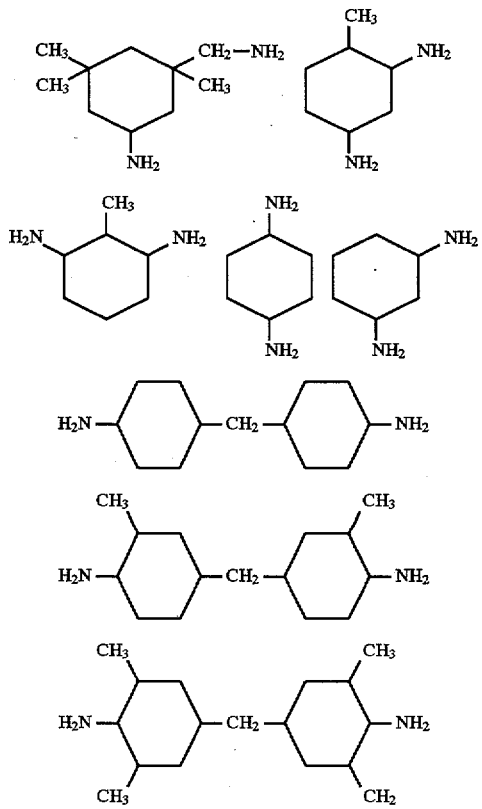

Araliphatic polyamines, such as 1,3- and 1,4-xylylene diamine or α,α,α',α'-tetramethyl-1,3- and -1,4-xylylene diamine can also be used as chain extension agents for the production of the prepolymers (A)(i).

The following compounds can also be considered as diamines in the context of the invention: hydrazine, hydrazine hydrate, and substituted hydrazines, such as methylhydrazine, N,N'-dimethylhydrazine and their homologs, as well as acid dihydrazides such as carbodihydrazide, oxalic acid dihydrazide, the dihydrazides of malonic acid, succinic acid, glutaric acid, adipic acid, β-methyladipic acid, sebacic acid, hydracrylic acid, and terephthalic acid, semicarbazidoalkylene hydrazides such as p-semicarbazidopropionic acid hydrazide (German Offenlegungsschrift 1,770,591), semicarbazidoalkylene carbazine esters, such as 2-semicarbazidoethylcarbazine ester (German Offenlegungsschrift 1,918,504) or else aminosemicarbazide compounds, such as β-aminoethyl-semicarbazidocarbonate (German Offenlegungsschrift 1,902,931).

Suitable blocking agents (2)(c) are preferably compounds that have one isocyanate-reactive group and undergo an addition reaction with organic isocyanates above 50° C. (preferably between 60° and 100° C.). Suitable such blocking agents are, for example, secondary or tertiary alcohols such as isopropanol or tert-butanol; C–H acidic compounds such as malonic dialkyl ester, acetylacetone, and acetoacetic alkyl ester, oximes such as formaldoxime, acetaldoxime, methyl ethyl ketone oxime, cyclohexanone oxime, acetophenone oxime, benzophenone oxime or diethylglyoxime, lactams such as ε-caprolactam, δ-valerolactam, γ-butyrolactam, phenols such as phenol, o-methylphenol; N-alkylamides such as N-methylacetamide, imides such as phthalimide, secondary amines such as diisopropylamine, imidazole, pyrazole, and 1,2,4-triazole. Preferred blocking agents for use according to the invention are methyl ethyl ketoxime, ε-caprolactam, and C–H acidic compounds such as malonic acid $C_1$–$C_4$ alkyl esters (preferably malonic diethyl ester), acetoacetic acid $C_1$–$C_4$ alkyl ester (preferably acetoacetic acid ethyl ester), or acetylacetone.

When preparing prepolymers (A)(i), the higher molecular weight polyhydroxyl compounds (2)(b) are generally used in a quantity of 50 to 70 wt. % (preferably of 55 to 65 wt. %), based on the total weight of the starting components for prepolymers (A)(i). The equivalent ratio of isocyanate groups of compound (1) to isocyanate-reactive groups of compounds (2) (not including the ionic or potentially ionic groups and without blocking agents) is generally 1.5:1 to 3:1. The quantity of blocking agent (2)(c) is, in general, proportioned so that about 50% (i.e., about half) of the NCO groups present after the prepolymerization are converted with the blocking agent and the remaining residue is subjected to a chain extension.

Compounds (A)(i) are at least partly known, for example, from WO 93/24,550.

Compound (A)(ii) includes (cyclo)aliphatic polyamines having a total of at least two primary and/or secondary amino groups and a molecular weight in the range 60 to 400 (preferably 100 to 250). Examples include ethylene diamine, hexamethylene diamine, diethylene triamine, 4,4'-diaminodicyclohexylmethane, 1,4-diaminocyclohexane, 3,3,5-trimethyl-5-aminomethylcyclohexylamine (IPDA), and any mixtures of such polyamines. Preferred polyamines are 4,4'-diaminodicyclohexylmethane and 4,4'-diamino-3,3'-dimethyldicyclohexylmethane. Also very highly suitable as crosslinking polyamines (A)(ii) are the addition products of diamines to acrylic acid mentioned above as compound (2)(a), such as are known from German. Offenlegungsschrift 2,034,479.

Polyamines (A)(ii) are used in the production of the aqueous dispersions according to the invention in amounts such that the molar ratio of blocked isocyanate groups of compound (A)(i) to primary and/or secondary amino groups of compound (A)(ii) is 1:0.9 to 1:1.2 (preferably 1:1 to 1:1.1).

Aqueous phase (B) consists for the most part of water but can also contain organic auxiliary solvents. Preferred organic auxiliary solvents include, for example, amides such as N,N'-dimethylformamide, N,N-dimethylacetamide, and N-methylpyrrolidone, ketones such as methyl ethyl ketone, diacetone alcohol, and cyclohexanone, ethers such as ethylene glycol monomethyl, monoethyl, and monobutyl ethers and the corresponding ethers of diethylene glycol, propylene glycol monomethyl and monobutyl ethers, and esters such as propylene glycol diacetate and dipropylene glycol methyl ether acetate. The quantity of the organic auxiliary solvents is preferably up to 20 wt. % (preferably up to 10 wt. %) based on the amount of aqueous phase (B). Particularly preferred dispersions to be used according to the invention are free of organic auxiliary solvents.

The aqueous phase content of the dispersions to be used according to the invention can amount to 10 to 70 wt. % (preferably 25 to 60 wt. %) based on the amount of ready-to-use dispersion.

Prepolymer (A)(i) that is present as a melt or a solution after production can be converted into an aqueous dispersion by mixing with water and, optionally, subsequent distilling off of the auxiliary solvent.

In principle, prepolymers (A)(i) can be converted into aqueous dispersions by any methods. Dispersion can be made without solvents, for example, by mixing the prepolymer melt with water in units that can generate high rates of shear, as well as with very small amounts of organic solvents for plasticization during the processing in the same units, and also by using non-mechanical dispersion means, such as sound waves of extremely high frequency. However, simple mixers, for example, agitated tanks or so-called continuous mixers, can also be used, since the prepolymers (A)(i) are self-dispersible. The so-called "acetone process" is preferred.

The production of the aqueous dispersions for use according to the invention can, for example, take place in such a way that the initial polyisocyanates (:1) are reacted by a one-pot reaction with NCO-reactive compounds, including the compounds (2)(a) and, optionally, compounds (2)(b), at 60° to 110° C. until the calculated NCO value of the reaction mixture, generally a value between 2.5 and 4.5 wt. %, is reached. The solution is then diluted with a solvent (such as acetone) which is inert to isocyanate groups and miscible with water. In this diluted solution of the NCO prepolymer, a fraction of the NCO groups (for example, half) reacts with a blocking agent (2)(c) at approximately 60° C. The remaining fraction of the NCO groups is then allowed to react with a chain extender, which can simultaneously contain an ionic group. When this reaction mixture no longer exhibits free NCO groups, compound (A)(ii) is mixed in, followed by dispersion with water. After solvent is removed by distillation, the dispersions according to the invention are obtained.

It is also possible to admix with the dispersions according to the invention the conventional auxiliaries and additives of leather and textile coating technology, for example, pigments, flow-control agents, UV stabilizers, antioxidants, fillers, or thixotropic agents. The ready-to-use aqueous coating agents thus obtained are storable practically without limitation at room temperature and cure at relatively low temperatures of 120° to 150° C. within 2 to 3 minutes to give coatings having very good dry adhesion strengths and, in particular, very good wet adhesion strengths.

Dispersions to be used according to the invention are particularly preferred for producing adhesive coatings, where they can fully exert their effect stemming from the two-stage curing process. After the initial physical drying at approximately 100° C., the tacky film that remains generously wets the top coat. After contact with the substrate and brief heating to 130° to 150° C., chemical crosslinking (that is, unblocking of the blocked NCO groups and the reaction of the compound (A)(ii)) takes place. The bond thus obtained has not been possible to date using aqueous binders according to the prior art.

In order to modify particular properties of the coatings that can be produced according to the invention, such as handle and surface smoothness, compounds containing oligomeric polysiloxane segments and having at least two isocyanate-reactive groups and molecular weights of 300 to 6,000 (preferably of 500 to 1,500) can be used. Difunctional polysiloxanes having organo-functional terminal groups are preferred. Such compounds have structural units having the formula —O—Si(R)$_2$—, where R stands for $C_1$–$C_4$ alkyl or phenyl, preferably methyl.

The aqueous dispersions to be used according to the invention are stable, storable, and transportable and can be processed at any subsequent point in time. Coatings with varying properties are obtained, depending on the Chemical composition selected and the urethane group content. Soft sticky coats, thermoplastic and rubber-elastic products with widely varying degrees of hardness, and soft top coats (compare Example 2), can be obtained in this way.

The dispersions to be used according to the invention are suitable for coating or for coating and impregnating woven and non-woven textiles and leather.

The dispersions to be used according to the invention are generally applied to the substrate without further additives. Application can be carried out by direct brushing onto the substrate with the aid of doctor knives, rollers, or wire knives. In general, several coats are applied one after the other, but preferably twice, so that the overall thickness of the coating consisting of base and top coat(s) is 10 to 100 μm (preferably 20 to 60 μm). A paste drying to a microporous coat can also be used as a base coat, as described in German Offenlegungsschrift 2,020,153 (believed to correspond to U.S. Pat. No. 3,687,715). The top coat thus applied protects the entire bond against mechanical stress and abrasion.

It is also possible, however, for the coating bond consisting of base and top coat to be applied by the so-called reverse method. In this method, the top coat is first applied to a release support and dried. After the application of a second base or adhesive coat, the substrate is pressed lightly into the still moist layer. After drying, a firm bond of coating and substrate, which is released from the release support and corresponds in its composition largely to the direct coating described above, is obtained.

A particular advantage is possible when the dispersions to be employed according to the invention are used for the adhesive coat and a polyurethane-coagulate-coated textile or leather are used as the substrate.

The following examples further illustrate details for the method of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all percentages are percentages by weight.

EXAMPLES

Example 1

Aqueous binder dispersions for an adhesive coat

| Batch: | |
|---|---|
| 500.0 g (0.5 equiv) | a polypropylene glycol of OH number 56 |
| 500.0 g (0.5 equiv) | a polyether polyol of OH number 56, produced by propoxylation of trimethylolpropane |
| 500.0 g (0.5 equiv) | a polycarbonate of OH number 56, based on 1,6-dihydroxyhexane |
| 247.5 g (0.11 equiv) | a monovalent polyether polyol of OH number 25 ("disperser"), produced by ethoxylation of n-butanol |
| 382.5 g (3.06 equiv) | 4,4'-diisocyanatodiphenylmethane (MDI) |
| 60.9 g (0.7 equiv) | butanone oxime |
| 134.7 g (0.7 equiv) | chain extenders (40% aqueous solution of an adduct of 1 mol acrylic acid and 1 mol ethylene diamine, neutralized with 1 mol NaOH) |
| 73.5 g (0.7 equiv) | 4,4'-diaminodicyclohexylmethane |
| 2550.0 g | water |
| 4949.1 g | dispersion |
| 2318.3 g | calculated solid components. |

The content in this NCO prepolymer of blocked NCO groups was 1.25%, polyethylene oxide units was approx. 10.0%, and carboxylate groups was 15 milliequivalents per 100 g.

Procedure

The total amount of MDI was introduced, and the water-free polyols and the "disperser" were added with stirring. The reaction mixture was heated to 80° C. After a reaction lasting approx. 5 hours at 80° C., an NCO content of 2.7% was measured (calculated as 2.8%). The mixture was cooled to approx. 60° C. and diluted with 2500 g acetone, after which the butanone oxime was stirred in. After a 30 minute reaction at approx. 55° C., the NCO content of the solution was 0.63% (calculated as 0.67%). The chain extender solution was then added dropwise and the resultant mixture was diluted with approx. 500 g of water. A cloudy acetone solution, in which no NCO content was detectable (IR spectrum), was obtained after 20 minutes of stirring at approx. 40° C. The diamine crosslinker was stirred in and dispersed within 15 minutes with the remaining portion of water. After the acetone was distilled off (40° to 50° C., 250 to 10 mbar, approx. 3 hours) a milky blue dispersion having a viscosity at 23° C. of approx. 500 mPa.s was obtained. The calculated solids content was 47%.

Properties 100 g of the above dispersion were converted with 0.3 g of WALUCEL® MT 6000 PV (thickener on cellulose base) into a brushable thixotropic coating composition for an adhesive coat.

First the top coat paste (solvent-containing) and then the adhesive coating composition according to the invention (applied weight dry approx. 15 g per m$^2$) was applied by knife to release paper and pre-dried at 100° C. The substrate, a polyurethane-coagulate-coated textile, was then placed on the coated release paper at room temperature and pressed in. The coated structure was then cured without pressure at approx. 160° C. (substrate temperature) in 2 minutes. Artificial coagulate leathers of this kind meet the Bally flexometer test without damage (150,000 foldings dry, 100,000 foldings wet).

Example 2

Aqueous binder dispersions for a top coat

| Batch: | |
|---|---|
| 150.0 g (0.15 equiv) | a polycarbonate of OH number 56, based on 1,6-dihydroxyhexane |
| 60.0 g (0.06 equiv) | a polypropylene glycol of OH number 56 |
| 70.0 g (0.07 equiv) | a polyether polyol of OH number 56, produced by propoxylation of trimethylolpropane |
| 49.5 g (0.022 equiv) | a monovalent polyether polyol of OH number 25 ("disperser"), produced by ethoxylation of n-butanol |
| 84.4 g (0.644 equiv) | 4,4'-diisocyanatodicyclohexylmethane |
| 14.1 g (0.14 equiv) | diisopropyl amine |
| 30.7 g (0.16 equiv) | chain extenders from Example 1 |
| 16.6 g (0.14 equiv) | 4,4'-diamino-3,3'-dimethyldicylohexylamine |
| 710.0 g | water |
| 1185.3 g | dispersion |
| 456.88 g | calculated solid components. |

The content in this NCO prepolymer of blocked NCO groups was 1.33%, polyethylene oxide units was approx. 11.2%, and carboxylate groups was 16.8 milliequivalents per 100 g.

Procedure

The water-free polyols as well as the "disperser" and the diisocyanate were allowed to react in a one-pot reaction at 100° C. in approx. 4.5 hours to an NCO content of 3.0% (calculated as 3.1%). The mixture was then diluted with 500 g of acetone. The acetone solution of the NCO prepolymer was blocked at 40° C. with diisopropyl amine (15 minutes), after which dimethylolpropionic acid, diluted with approx. 50 g of water, was added dropwise. When the control measurement no longer indicated an NCO content after a reaction of approx. 30 minutes at 35 to 40° C. (IR spectrum), the diamine crosslinker was stirred in, followed by dispersion with the remaining amount of water. After the acetone was distilled off (approx. 3 hours, 250 to 10 mbar, 40° to 50° C.) a dispersion with a viscosity at 23° C. of approx. 2300 mPa.s was obtained. The calculated solids content was 40%.

Properties

A film having a weight per unit area 91 g/m² was produced from the above dispersion (curing 2 minutes at 150° C.). The following mechanical properties were measured:

| Modulus 100% | 3.3 MPa |
|---|---|
| Tensile strength/elongation (DIN 53504) | |
| dry | 24.6 MPa/690% |
| wet (24 h storage in water) | 16.9 MPa/820% |

These values are exceptionally good for a soft top coat.

Example 3

Aqueous coating composition dispersion for an adhesive coat permeable to water vapor

| Batch: | |
|---|---|
| 100.0 g (0.1 equiv) | a polyether polyol of OH number 56, produced by propoxylation (50%) and ethoxylation (50%) of propylene glycol |
| 100.0 g (0.1 equiv) | a polyether polyol of OH number 56, produced by propoxylation of trimethylolpropane |
| 100.0 g (0.1 equiv) | a polycarbonate of OH number 56, based on 1,6-dihydroxyhexane |
| 49.5 g (0.022 equiv) | a monovalent polyether polyol of OH number 25 ("disperser"), produced by ethoxylation of n-butanol |
| 76.5 g (0.612 equiv) | 4,4'-diisocyanatodiphenylmethane |
| 12.1 g (0.14 equiv) | butanone oxime |
| 26.8 g (0.14 equiv) | chain extenders from Example 1 |
| 35.0 g (0.14 equiv) | the addition product of 1 mol 3,3'-dimethyl-4,4'-diaminodicyclohexylmethane and 0.4 mol acrylic acid, neutralized with 0.4 mol NaOH, dissolved 56.56% in isopropanol/water (The NH/NH₂ equivalent of this solution was 250 g.) |
| 825.0 g (35%) | water |
| 1324.9 g | dispersion |
| 468.6 g | calculated solid components. |

The content in this NCO prepolymer blocked NCO groups was 1.3%, polyethylene oxide units was approx. 22.1%, and carboxylate groups was 15 milliequivalents per 100 g.

The diamine (A)(ii) serving for the crosslinking of component (A)(i) in this Example itself possesses carboxylate groups in order to increase the water vapor permeability of the resulting coating.

Procedure

The water-free polyols including the "disperser" were allowed to react together with MDI for 5 hours at 80° C. until an NCO content of 2.7% (calculated as 2.8%) was obtained. The mixture was then diluted with 500 g of acetone and allowed to react for 30 minutes at 30° C. with butanone oxime until an NCO content of 0.61% was measured (0.67% is calculated). The chain extender, diluted with 50 ml of water, was then added dropwise. After a reaction time of 30 minutes at approx. 30° C. the acetone solution no longer contained any NCO groups. The diamine crosslinker was stirred in, dispersion with water took place, the acetone was extracted under reduced pressure at 40° to 50° C., and a milky cloudy dispersion having a viscosity at 23° C. of approx. 1600 mPa.s was obtained. The calculated solids content was 35%.

Properties 100 g of the dispersion were thickened with 3 g of polyacrylic acid thickener to a brushable paste. A film having a weight per unit area: 95 g/m² was produced on release paper by drying at 50° to 80° C. and subsequent condensation at 150° C. (5 minutes).

The following mechanical properties were measured:

| Modulus 100% | 1.2 MPa |
|---|---|
| Tensile strength/elongation | |
| dry | 9.7 MPa/610% |
| wet (24 h storage in water) | 4.9 MPa/550% |
| hydrolysis 14 d/70° C./95% rel. hum | 9.0 MPa/580% |

A film with a film thickness of 45 g/m² exhibited a water vapor permeability of 20,800 g/m². The water vapor permeability was determined by the general method of DS 2109 TM1 of British Textile Technology Group, Manchester, England. A double thickness of capillary matting was saturated with distilled water and placed in a chamber having a constant temperature of 20° C. (±1° C.) and a relative humidity of about 65%. About 15 g of dry silica gel in the form of beads having a diameter of about 3 to 5 mm were placed in a plastic cup having an internal diameter at the opening of 61 mm, and the cup and its content were accurately weighed ($W_1$). The test film was attached firmly over the opening of the plastic cup with a clamping ring and inverted onto the water-soaked capillary matting, which provides a relative humidity at the film surface of 100%. After an accurately timed interval of about one hour, the cup was removed from the wet capillary matting, the clamping ring and test film were removed from the cup (with care being taken to assure that no silica gel beads adhered to the film or were otherwise lost from the cup), and the cup and its content were again accurately weighed ($W_2$). The water vapor permeability in $g/m^2$ per day was calculated from the experimentally determined values $W_1$ and $W_2$ (each in grams) using the formula $WVP=[(W_2-W_1)\times 24]/(a\times t)$, where t is the time in hours between successive weighings and a is the area in $m^2$ of the exposed test film (calculated using the formula $\pi d^2/4$, where d is the internal diameter of the opening in the cup). For the test cup used in Example 3, the formula reduced to $WVP=(W_2-W_1)\times 8216$. The values for water vapor permeability are relatively insensitive to film thickness within the range of test thicknesses used in Example 3.

What is claimed is:

1. A method comprising coating a textile and/or leather with an aqueous dispersion comprising (A) a mixture comprising
  (i) a urethane-containing blocked NCO prepolymer having a number average molecular weight of 2000 to 10,000, a content of blocked isocyanate groups, calculated as NCO, of 0.5 to 5 wt. % relative to prepolymer (A)(i), a content of ethylene oxide groups of 2 to 50 wt. % relative to prepolymer (A)(i), and a content of ionic groups of 5 to 30 meq per 100 g of prepolymer (A)(i), and
  (ii) a polyamine having a total of at least two (cyclo) aliphatically bonded primary and/or secondary amino groups,
wherein the equivalent ratio of blocked NCO groups of prepolymer (i) to amino groups of polyamine (ii) is 1:0.9 to 1:1.2, and (B) an aqueous phase.

2. A method according to claim 1 wherein the blocked NCO prepolymer has a number average molecular weight of 3500 to 7000.

3. A method according to claim 1 wherein the blocked NCO prepolymer has an ethylene oxide group content of 5 to 25 wt. %.

4. A method according to claim 1 wherein the blocked NCO prepolymer has an ionic group content of 10 to 20 meq per 100 g of prepolymer (A)(i).

5. A method according to claim 1 comprising coating the aqueous dispersion onto the textile and/or leather by the reverse method.

* * * * *